Oct. 22, 1968  E. E. STICKLEY ET AL  3,406,604

TIME AND RHYTHM INDICATING DEVICE

Filed Sept. 7, 1965  2 Sheets-Sheet 1

INVENTORS
ELMER E. STICKLEY
MICHAEL MCKEOWN

ATTORNEY

United States Patent Office 3,406,604
Patented Oct. 22, 1968

3,406,604
TIME AND RHYTHM INDICATING DEVICE
Elmer E. Stickley, 9 Leisurely Lane, Bellport, N.Y. 11713, and Michael McKeown, Mott Lane, Hamlet of Brookhaven, Brookhaven, N.Y. 11719
Filed Sept. 7, 1965, Ser. No. 485,358
5 Claims. (Cl. 84—484)

ABSTRACT OF THE DISCLOSURE

A metronome of flexible musical capacity, including a card bearing visible indicia indicative of a selected rhythm pattern to which the device is set, including a plurality of circularly arranged contacts, a motor driven wiper sequentially engaging the circularly arranged contacts and a plurality of linearly arranged contacts, the card being appropriately notched to energize and de-energize a selected one of the linearly arranged contacts in accordance with the selected rhythm pattern, and means for selectively varying the speed of the motor driven wiper.

---

This invention relates to time indicating devices, and more particularly to a metronome for musical purposes which is conveniently and visibly programmable for producing a wide variety of rhythm and tempo effects.

It is an object of the invention to provide a metronome of flexible musical capability, whose setting or adjustment at any time may be discerned at a distance, from an examination of a card protruding therefrom and which is appropriately marked, the said card being removable, and there being one such said card for each different setting or adjustment which is contemplated for the metronome.

By the use of novel arrangements and circuitry about to be described, it is possible to arrange that each said card in addition to providing a visible indication of the musical criteria under contemplation at that instant in such a manner that the musical novice can not only read and comprehend it as well as learn the conventional musical notation for that particular example, but as will be shown, the card itself, because of its unusual arrangement, together with the special equipment in the remainder of the mechanism especially adapted to that purpose, is enabled to program the metronome in such a manner as to cause it to operate in the mode described on the visible portion of its printed legend.

It is therefore an object of the present invention to provide a musical metronome which provides a visible description of its current function by means of a notation on a removable card associated therewith.

It is another object of this invention to provide such a metronome wherein the said card is so constructed as to dictate and determine the current function of the metronome.

Another object of the present invention is to provide a legend-bearing card usable in the manner aforesaid.

The invention is a teaching device for the development of comprehension of and skill in the utilization of rhythmic patterns. Its primary utility lies in the teaching of rhythmic patterns in the dance, music, and other activities where the development of coordination is important.

A variety of metronome devices is known to the art, wherein the several beats of a musical measure are successively and identically indicated. It is a feature of the present invention however, that the successive beats of the measure need not be identical, but may differ in spacing in any desired and predetermined manner, so that the versatility of the instrument in teaching the more complex rhythm patterns is quite beyond anything heretofore available for this purpose. This ability to be programmed for a plurality of beats which are not necessarily identical is useful also in teaching simpler rhythms where a change occurs during performance of the selection. Such a situation has not heretofore been susceptible to teaching by use of a metronome, but the instant invention is capable of being programmed for two, three or four short measures which need not be the same.

For this reason it is especially advantageous in providing an extension of the capabilities of the music teacher by enabling the student to drill alone as extensively as necessary once the initial instructions have been given to him by the music teacher.

These and further objects which will later become apparent we achieve by providing a sequence scanning device which also is responsive to a predetermined program for its operation, in combination with a sheet of musical indication material for partial insertion therein, bearing visible indicia which remain exposed and bearing a plurality of discrete informational areas which are inserted within the device for scanning to produce an audible sequential beat pattern, and also bearing other such areas operative upon insertion to program the device in the required mode of operation.

A clearer understanding of the invention may be had by reference to the following detailed description of a specific illustrative example of what is presently regarded as the best method of practicing the invention, when taken in conjunction with the accompanying drawings wherein like numerals designate the same part in the several views, and wherein.

Figure 1:
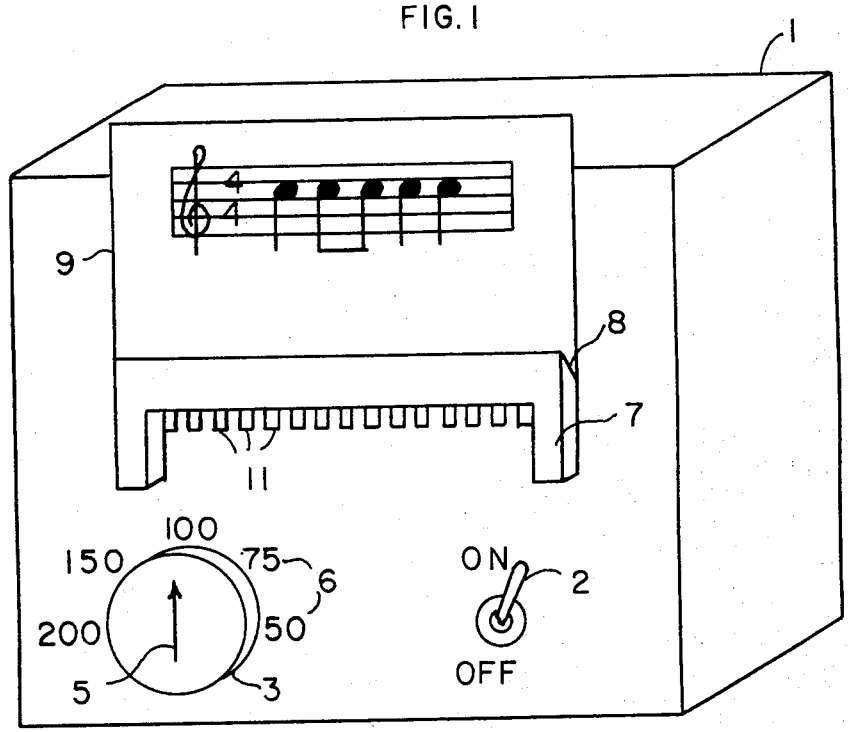
FIG. 1 is a perspective view of an embodiment of the instant invention.
Figures 2, 3:
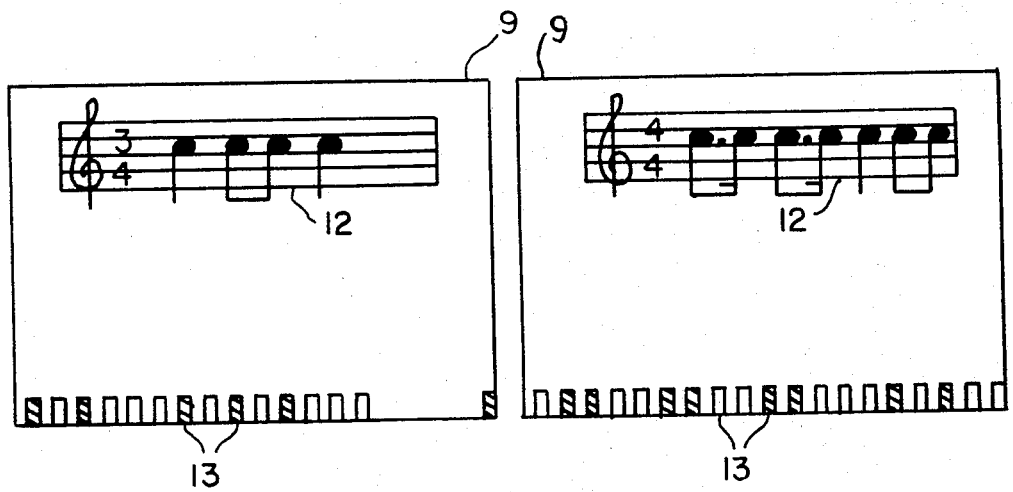
FIG. 2 is a front view of card as prepared for use in FIG. 1.
FIG. 3 is a front view of another card showing a different musical scale.
Figure 4:
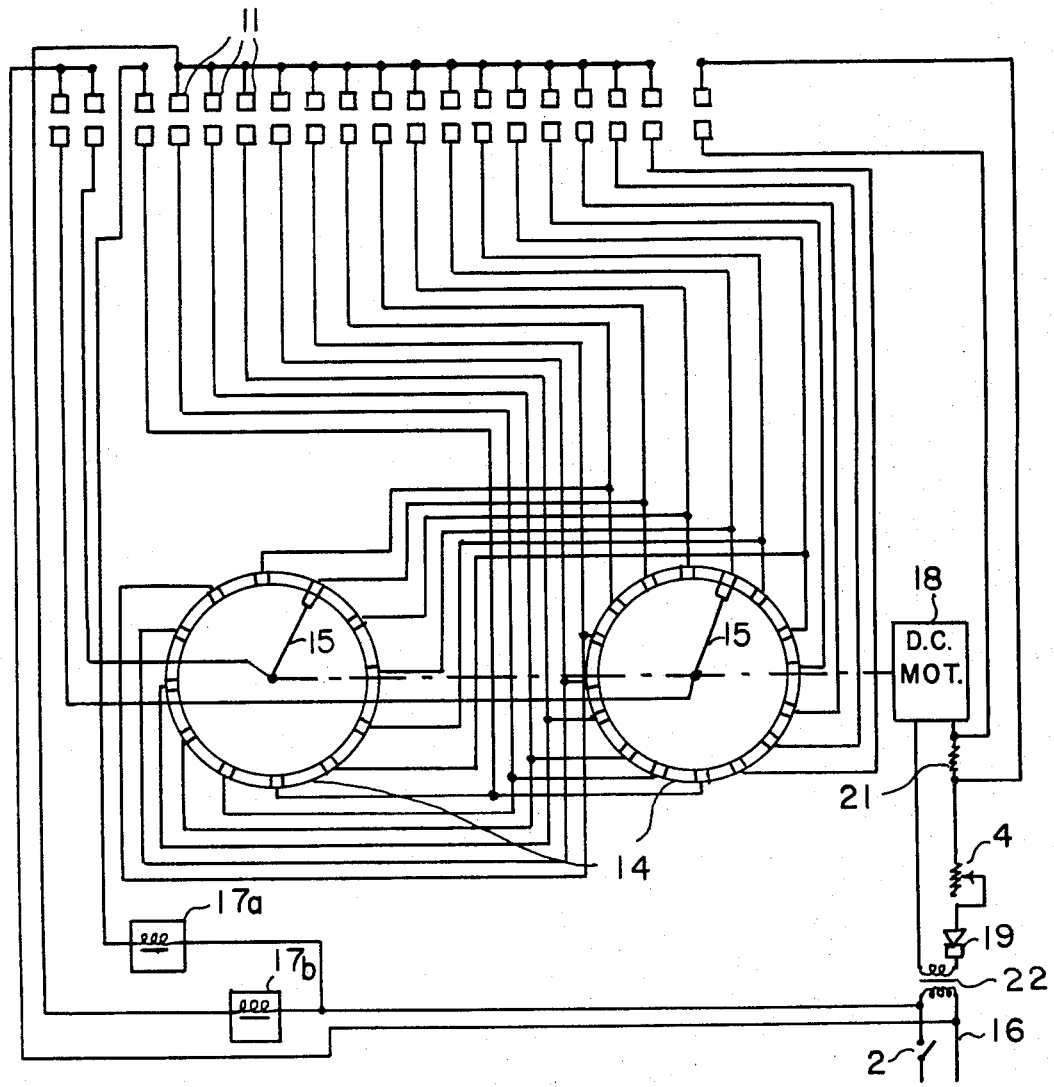
FIG. 4 is an electrical wiring diagram of the circuits of FIG. 1.

Turning now to the drawings, there is seen at 1 a container housing the electrical parts of the instant invention, and which may be constructed of either wood or metal, or, in the event that greater economy associated with high production is feasible, may be molded from a phenol-formaldehyde resin or any of the wide variety of other suitable plastic materials which are available for this purpose. An electrical on-off switch such as the snap toggle shown at 2 is mounted on the front panel of container 1, as is the control knob 3 of the rheostat 4, the said knob being provided with an arrow 5 or similar digital index or indicator for use in conjunction with the numerals such as 6 which are embossed or printed on the container 1. A holder 7 projects from the front panel of container 1, and provides a slot seen at 8 wherein a card 9 can be inserted for programming electrical circuitry associated with the flexible metallic card sensing fingers of well known kind, whose ends may be seen at 11. The card 9 bears a printed or written designation 12 of the particular rhythm and tempo which it is constructed to produce, and a series of areas such as 13 marked off for notching such that the notched portions will permit the closure of the correspondingly located switches 11. It is of course to be observed that notches of the form indicated are not the only means by which these results can be accomplished, and a card having holes punched in it at appropriate locations also is effective. Such a card may be used to operate feeler switches as above described, or may be read by sensing pins or radiation detectors located for actuation by a source on the opposite side of the card, such as a lamp, for example. It is also possible to arrange the card for magnetic actuation of the switches, or for the reflection of radiation, but the described method of mechanical switch opening by uncut card areas is presently preferred for reasons of simplicity and economy.

A rotary scanning switch of conventional kind 14, having two decks or levels embodying twelve and sixteen switch points respectively, has its switch points connected to the blades of switches 11, so that when the latter are duly programmed with a prearranged array of closures by a card 9, the rotation at constant speed of the wipers 15 will place in circuit with the electrical supply line 16 a duly programmed one of electrical click producer (such as the well known telegraph sounder) 17b or the single stroke bell 17a.

In the alternative, we may provide a single deck switch of 48 points, which can by selection be utilized as either a 16 point switch or a 12 point switch through connecting every third or every fourth switch point as needed.

Wipers 15 are rotated simultaneously by a direct current motor 18 of a very low speed rating or of the gear head (speed reducing) type. A rectifier 19 provides the necessary direct current to motor 18 through transformer 22 from mains 16. A rheostat 4 controls the speed of motor 18 and thus the tempo of sounders 17a and 17b. Since some music is written to have a number of beats in a measure based on 3, and other music is so based on 4, the two decks of switch 14 have 12 and 16 contacts respectively which are programmed for the desired rhythm by insertion of a properly notched card 9, which causes contact to be made only to the appropriate switch. In order for the calibration numerals 6 associated with the knob 3 of resistor 4 to correctly indicate speed in either such case, however, it is necessary to change the speed of motor 18 correspondingly. This is accomplished by means of the resistor 21 which is inserted in series with the electrical input thereof, to cause slower rotation of the motor by the desired amount, or which may be conductively by-passed by closure of one of the switches 11 by insertion of a card 9 which has been appropriately prepared as a part of its program.

Although this invention has been described in terms of a specific illustrative example of the preferred method of practicing it, it will be apparent to those having skill in the art that various modifications, alterations and additions as well as the substitution of equivalent parts such as stepping switches for the described rotary scanner and well known electronic timing devices for the described motor speed control can be made without any departure from the essential spirit of the combinatorial invention. It therefore is intended that the invention be limited only by the appended claims.

What is claimed is:

1. Apparatus to provide a repetitive program of sensible indications at an adjustable constant rate wherein the indications within said program are arbitrarily arranged in any one of a wide variety of predetermined rhythms including indicating means operable to provide a sensible indication, a plurality of actuating means for said indicating means for the actuation thereof, a plurality of energizing means including one for each said actuating means in engagement therewith, a card having discrete areas prepared to defeat the operation of selected ones of said energizing means when placed in conjunction with said energizing means, and bearing indicia descriptive of the pattern of a predetermined rhythm of selected energizing means, said indicia being exposed and readily legible at a distance when said card is so placed in conjunction with said energizing means, rotating scanning means interconnected between said energizing means and said activating means for operation thereof, and speed control means for said rotating scanning means comprising a manually controllable portion and a card programmable portion whereby preselected card area control of a said energizing means is effective upon card insertion to modify scanning speed.

2. An electric metronome comprising sounding means, motor driven rotary switch means for scanning a plurality of input circuits at an adjustable constant rate, input circuits each having circuit interruption means connected to said scanning means, and a card adapted to actuate preselected ones of said circuit interruption means upon partial insertion thereof in said metronome, and bearing indicia visible at a distance descriptive of the pattern of said actuation, whereby the sound pattern of said sounding means is determined by the insertion of said card, and its description is legible on the protruding card portion, said rotary switch means comprising a direct current operated gear motor, a rheostat in series therewith for manual speed control, and a further fixed resistor in series therewith which is also connected in parallel with one of the said circuit interruption means whereby said fixed resistor is shorted out by said one of said circuit interruption means for speed programming by said card.

3. The device of claim 2 wherein said rotary switch means comprises two decks of contacts, the number of contacts on one of said decks being divisible by 3 and the number of contacts on the other said deck being divisible by 4.

4. The device of claim 1 wherein said sensible indications comprise a gong and a clicker, the said actuating means comprise contacts of a rotary scanner, the said plurality of energizing means comprise card notch feeler switches, and the said indicia comprise at least one musical bar with staff, signature and notes.

5. A device for producing audible rhythmic timing patterns of a repetitive nature, which comprises a plurality of electrical switch contacts in circular array, a wiper arranged to rotate at uniform speed over the said switch contacts to make contact with them successively and repetitively, a multiple switch assembly, having a plurality of switches distributed in a linear array, card means located for operating prearranged ones of said plurality of switches, sounding means connected to said wiper, means to energize said switches, and means to rotate said wiper.

References Cited

UNITED STATES PATENTS 3,189,692   6/1965   Andregg _____ 179—90.2

RICHARD B. WILKINSON, *Primary Examiner.*

GARY M. POLUMBUS, *Assistant Examiner.*